(12) United States Patent
Suzuki et al.

(10) Patent No.: US 7,291,204 B2
(45) Date of Patent: Nov. 6, 2007

(54) SEPARATION MEMBRANE MODULE WITH HOLLOW FIBER AND A METHOD OF MAKING THE SAME

(75) Inventors: Masahiro Suzuki, Saitama (JP); Tsunehiko Naganuma, Ibaraki (JP)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/454,994

(22) Filed: Jun. 5, 2003

(65) Prior Publication Data
US 2004/0020845 A1 Feb. 5, 2004

(30) Foreign Application Priority Data
Jun. 14, 2002 (JP) ............................. 2002-174610

(51) Int. Cl.
*B01D 53/22* (2006.01)
(52) U.S. Cl. ............................. 96/8; 96/6; 96/10; 96/13; 95/45; 95/46; 210/321.8; 210/321.89; 210/500.23
(58) Field of Classification Search ............... 95/46, 95/45; 96/6, 8, 10, 13; 55/DIG. 5; 210/321.8, 210/321.89, 500.23
See application file for complete search history.

(56) References Cited

U.S. PATENT DOCUMENTS

| | | | | |
|---|---|---|---|---|
| 3,262,251 A | * | 7/1966 | Hicks, Jr. | 96/8 |
| 3,269,817 A | * | 8/1966 | Bondley | 96/8 |
| 4,308,654 A | * | 1/1982 | Bogart | 29/451 |
| 4,323,453 A | * | 4/1982 | Zampini | 210/321.61 |
| 4,657,742 A | * | 4/1987 | Beaver | 422/240 |
| 4,975,187 A | * | 12/1990 | Espenan | 210/321.89 |
| 5,662,843 A | * | 9/1997 | Monzen et al. | 264/41 |
| 5,695,702 A | * | 12/1997 | Niermeyer | 96/8 |
| 5,858,065 A | * | 1/1999 | Li et al. | 96/8 |
| 5,885,454 A | * | 3/1999 | Yagihashi et al. | 210/321.78 |
| 6,224,765 B1 | * | 5/2001 | Watanabe et al. | 210/321.61 |
| 6,447,679 B1 | * | 9/2002 | Watari et al. | 210/500.23 |
| 6,495,041 B2 | * | 12/2002 | Taniguchi et al. | 210/321.89 |
| 2001/0013272 A1 | * | 8/2001 | Blase et al. | 96/8 |
| 2001/0035093 A1 | * | 11/2001 | Yokota | 96/8 |
| 2004/0144712 A1 | * | 7/2004 | Stroh et al. | 210/321.89 |

FOREIGN PATENT DOCUMENTS

JP 4-354521 12/1992

* cited by examiner

*Primary Examiner*—Jason M. Greene
(74) *Attorney, Agent, or Firm*—Richard W. Ellis (57) ABSTRACT

A separation membrane module having hollow fibers, wherein a plurality of hollow fibers are heated and melted to bond and thermally fuse the external surfaces of the hollow fibers with each other; and a method of manufacturing a separation membrane module having hollow fibers whereby the ends of a plurality of hollow fibers are inserted into a sheath, the sheath and the hollow fibers are tightly bonded together to form spaces, and the sheath portion into which hollow fibers have been inserted is heated up to the temperature at which the surfaces of the hollow fibers melt, with the spaces thus formed kept in a decompressed state, so that the exterior surfaces of the hollow fibers are thermally fused and integrated together.

14 Claims, 5 Drawing Sheets

SEPARATION MEMBRANE MODULE WITH HOLLOW FIBER AND A METHOD OF MAKING THE SAME

BACKGROUND OF THE INVENTION

1. Field of the Invention

The present invention relates to a separation membrane module provided with a large number of hollow fibers, and in particular to a separation membrane module having hollow fibers that is used for the purpose of gas separation, degassing, dissolution of gases in liquids, and the like, and that has a large number of hollow fibers in which a thermofusible synthetic resin is provided at least on the surfaces thereof; and to a manufacturing method thereof.

2. Description of Related Art

Separation membrane modules that use hollow fibers have an increased membrane surface area per unit volume, and are therefore used as modules having a large number of porous separation membranes in the form of hollow fibers.

The vacant spaces between the hollow-fiber separation membranes, and the voids between the hollow-fiber separation membranes and the outer cylinder for housing these membranes, are sealed by a sealant or the like at both ends of the large number of hollow-fiber separation membranes in a separation membrane module having hollow fibers to guaranteed airtightness.

The method whereby a low-viscosity resin, such as epoxy resin, urethane resin, or silicone resin, is injected into the ends as a sealant and caused to thoroughly fill the voids by being left at rest subjected to centrifugal force, and then cured by heating, is known as a method of sealing the voids between the outer cylinder and hollow fiber bundles, and between the hollow fiber bundles themselves.

However, the sealant resins are inadequate in terms of heat resistance and chemical resistance. Therefore, their use is limited to applications in which acid- or alkali-containing solutions or organic solvents are used as the media or liquid detergents, or to applications in which steam sterilization is performed.

On the other hand, when a thermofusible resin is used as a sealant for hollow fibers, it is difficult to penetrate fine voids, such as those between the outer cylinder and hollow fiber bundles or between the hollow fiber bundles, if the viscosity of the thermofusible resin is high. Moreover, it is difficult to defoam high-viscosity resins once air bubbles have formed, and inadequate sealing sometimes results.

Methods have also been proposed in which an outer cylinder with through-holes in the form of a beehive (that is, a honeycomb) is preformed from a resin, and hollow fibers are then inserted into the through-holes and melted by heat, but it is difficult in itself to form a large number of through-holes at a high density in the outer cylinder, and it is difficult to completely seal the voids. Consequently, it is impossible to finely mold sealed parts using a thermofusible resin, and neither is it possible to raise the hollow fiber packing rate by these methods.

Moreover, Japanese Kokai Patent No. 4-354521 proposes a method of manufacturing a hollow-fiber porous separation membrane element whereby a thermofusible resin that has been melt-molded into a predetermined shape is inserted into one end of an outer cylinder, and while this thermofusible resin is heated and melted, bundles of hollow-fiber porous separation membranes made from fluororesin are inserted from the other end of the outer cylinder and embedded in the thermofusible resin by gravity, loading, attraction, or a combination of these to form a sealed end part from the thermofusible resin. However, it is necessary to use porous polytetrafluoroethylene for the hollow fibers, and to provide a separate sealing material.

These and other purposes of the present invention will become evident from review of the following specification.

SUMMARY OF THE INVENTION

The object of the present invention is to provide a separation membrane module having hollow fibers at a high hollow fiber packing rate, in which there is a very good seal in the sealed parts of the hollow fibers, in which excellent airtightness can be guaranteed without the presence of air bubbles or the like, and in which there is no need to use a resin for sealing the hollow fibers together.

An object of the present invention is to provide a separation membrane module having hollow fibers, this separation membrane module having hollow fibers characterized in that a plurality of hollow fibers are heated and melted to bond and thermally fuse the external surfaces of the hollow fibers with each other.

In the above-mentioned separation module having hollow fibers, a layer of a thermofusible substance is formed solely on the external surfaces of the hollow fibers.

In the above-mentioned separation membrane module having hollow fibers, the hollow fibers are formed from a thermofusible substance.

The present invention also provides a method of manufacturing a separation membrane module having hollow fibers, this method of manufacturing a separation membrane module having hollow fibers performed in a manner such that the ends of a plurality of hollow fibers are inserted into a sheath, the sheath and the hollow fibers are tightly bonded together to form spaces, and the sheath portion into which hollow fibers have been inserted is heated up to the temperature at which the surfaces of the hollow fibers melt, with the spaces that have been formed between the sheath and hollow fibers kept in a decompressed state, so that the exterior surfaces of the hollow fibers are thermally fused and integrated together.

The present invention also provides a method of manufacturing a separation membrane module having hollow fibers, this method of manufacturing a separation membrane module having hollow fibers performed in a manner such that hollow fibers are inserted into the opening of a flange-forming member with a lower glass transition point than that of the hollow fibers, and are heated to a temperature at which the hollow fibers will not melt, to fuse the flange-forming member to the hollow fibers, and thereby to form a flange portion.

In the above-mentioned method of manufacturing a separation membrane module having hollow fibers, the hollow fibers are subjected to a process in which the ends of a plurality of hollow fibers are inserted into a sheath, the sheath and the hollow fibers are tightly bonded together to form spaces, and the sheath portion into which hollow fibers have been inserted is heated up to the temperature at which the surfaces of the hollow fibers melt, with the spaces thus formed kept in a decompressed state, so that the exterior surfaces of the hollow fibers are thermally fused and integrated together.

DESCRIPTION OF THE DRAWINGS

The operation of the present invention should become apparent from the following description when considered in conjunction with the accompanying drawings, in which.

DETAILED DESCRIPTION OF THE INVENTION

The present invention results from the discovery that the ends of a plurality of hollow fibers, at least the surface of which has been formed from a thermofusible synthetic resin, are inserted into a sheath; the sheath and the hollow fibers are kept tightly together; and the sheath is then heated up to a temperature at which the surface of the hollow fibers will melt while the spaces between the sheath and the hollow fibers are kept in a decompressed state, whereupon the molten synthetic resin at the surface of the hollow fibers flows into the spaces between the hollow fibers in accordance with the stream that flows between the hollow fibers due to decompression, the spaces between the hollow fibers become filled by the molten synthetic resin from the surface of the hollow fibers, and the hollow fibers are thermally fused and integrated together.

The spaces formed between the hollow fibers are decompressed from one end, so when some of the spaces are packed, the flow of gas concentrates in the area where there are still spaces left, and decompression is achieved. Therefore, the hollow fibers are packed, thermally fused, and integrated together without any air bubbles forming in the spaces between the hollow fibers.

Moreover, the synthetic resin that is used for thermal fusion is characterized in that it is produced by the melting of the hollow fibers, making it possible to obtain a very high hollow fiber packing rate without the use of a separate sealing material.

Figure 1:
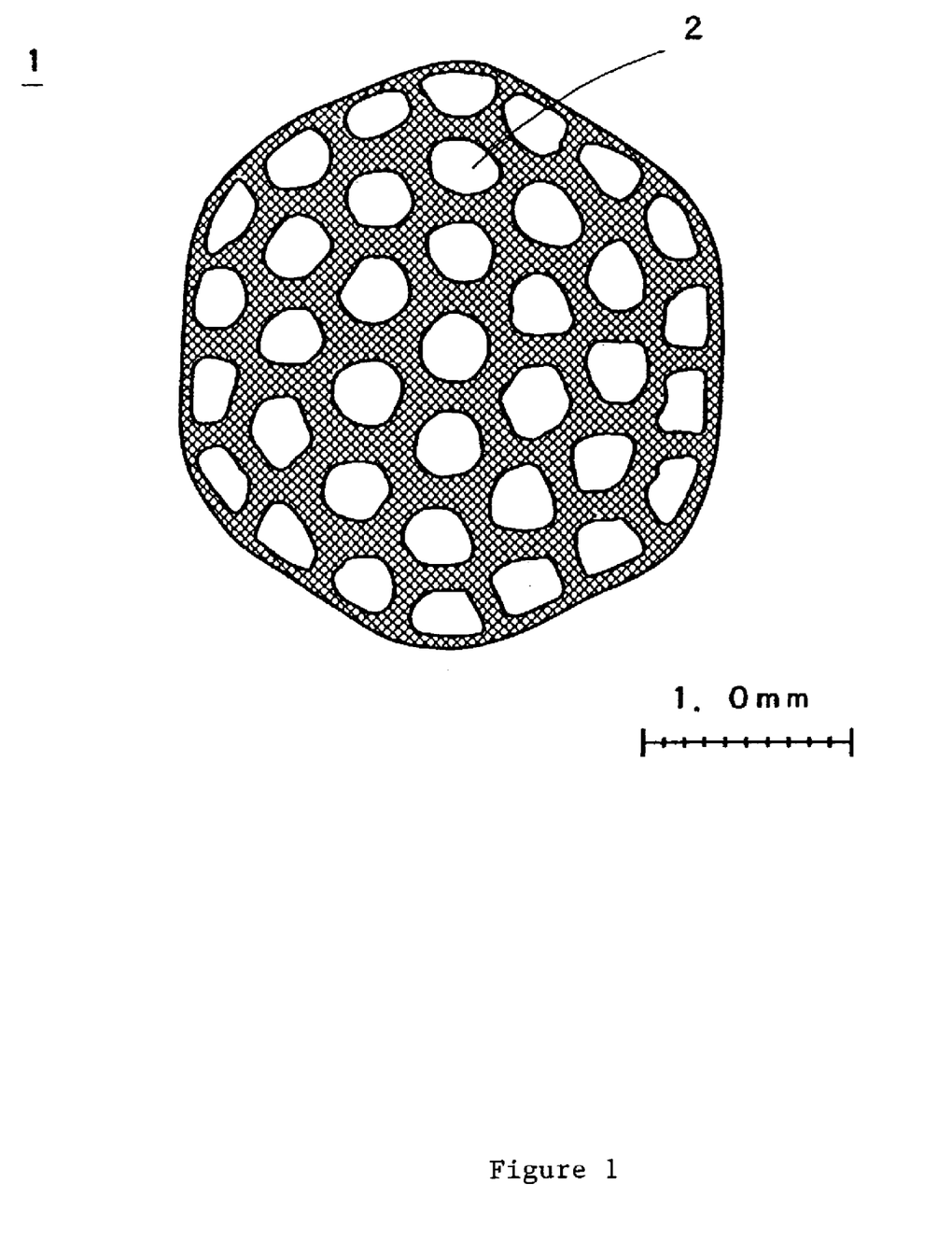
FIG. 1 is a drawing that illustrates a cross section where the end of the separation membrane module having hollow fibers of the present invention has been joined and integrated.

FIG. 1 is a drawing that illustrates a cross section where the ends of the separation membrane module having hollow fibers of the present invention have been joined and integrated.

The separation membrane module 1 having hollow fibers that is shown in FIG. 1 comprises 37 integrated hollow fibers 2. The module is manufactured by bonding and inserting the hollow fibers into a regular hexagonal sheath disposed at one end of the separation membrane module 1. The spaces between the hollow fibers 2 are packed with synthetic resin that has melted during thermal fusion so that there are no spaces between the hollow fibers, and the 37 hollow fibers 2 are fused and integrated together. The present example is one that has been manufactured by insertion into a regular hexagonal sheath, but the sheath can be any shape.

Figure 2:
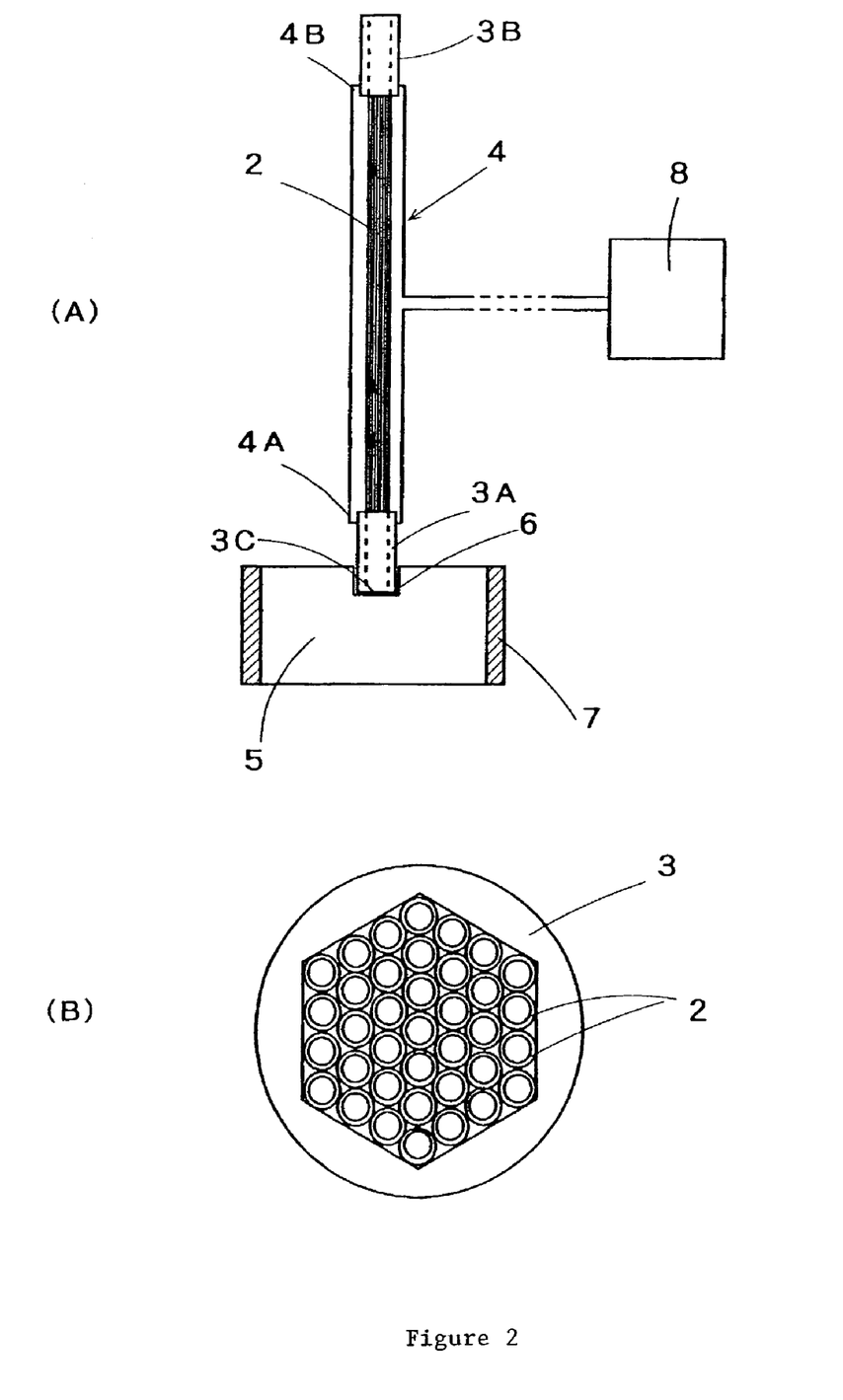
FIG. 2 is a drawing that illustrates the method of manufacturing a separation membrane module having hollow fibers of the present invention.

FIG. 2 is a drawing that illustrates the method of manufacturing a separation membrane module having hollow fibers of the present invention. FIG. 2(A) is a cross-sectional view, and FIG. 2(B) is a cross section of the sheath portion.

The method of manufacturing a separation membrane module will now be described. One end of the 37 hollow fibers 2 fashioned into an integrated separation membrane module is inserted into a hexagonal sheath 3A, one end 4A of a decompression tube 4 is inserted into the sheath 3A, and the spaces between the sheath 3A and one end 4A of the decompression tube 4 are kept airtight.

Next, a sheath 3B into which the hollow fibers 2 have been placed is inserted into the other end 4B of the decompression tube 4, and the spaces between the other end 4B of the decompression tube and the sheath 3B are kept airtight.

In FIG. 2(B), the hollow fibers 2 are placed inside the sheath 3 so that they are bonded to the inside of the regular hexagonal opening, as shown by the cross section of part of the sheath portion.

Next, tip 3C of the sheath 3A is placed inside the indentation 6 of a mold 5, and the mold 5 is heated by a heater 7 up to the melting temperature of the hollow fibers as the inside of the decompression tube 4 is decompressed by a decompression pump 8.

Air is suctioned through the spaces between the hollow fibers inside the sheath to the decompression tube as a result of reduced pressure. However, when the hollow fibers are heated from the outside and their surfaces melt, the resulting melt flows together with the suctioned air current and becomes embedded between the hollow fibers. Meanwhile, the temperature at the top of the sheath is lower than the temperature inside the mold, so the melt is allowed to cool, to pack the spaces between the hollow fibers, and to solidify.

Moreover, when some the spaces inside the sheath become packed with the melt, the air current inside the sheath passes through the unpacked spaces and acts to pack this portion with the melt. As a result, it is possible to pack all of the spaces.

Moreover, even if air bubbles are present in the melt, they are suctioned by the decompression tube, and the air bubbles are therefore released by decompression and do not remain in the packed part between the hollow fibers.

If the decompression-induced pressure difference increases, the speed of flow of the gas through the spaces between the hollow fibers will increase. However, the speed of the gas current also depends on the viscosity and other properties of the melt produced by the melting of the hollow fibers, and the extent of decompression can therefore be set as needed in accordance with the size of the spaces formed between the hollow fibers, the properties of the melt, and the like.

Moreover, any material can be used for the sheaths 3A and 3B as long as it is a heat-resistant material. It is preferable, however, to use a synthetic resin such as polytetrafluoroethylene or another fluororesin with high heat resistance.

As previously mentioned, once one end is integrated by thermal fusion, the other end may also be integrated by thermal fusion in the same manner.

In addition, the example in FIG. 2 is one where the fused part is at the bottom and gas is suctioned up. By means of this method, it is possible to prevent an uneven distribution due to gravity, even if the melt of the hollow fibers forms a large flow.

The hollow fibers integrated in this manner by the fusion of their ends can be used after being attached to a variety of members. However, by forming a flange portion at the fused part, the assembly can be easily linked, mounted, or otherwise attached to a device or the like to obtain good airtightness.

Figure 3:
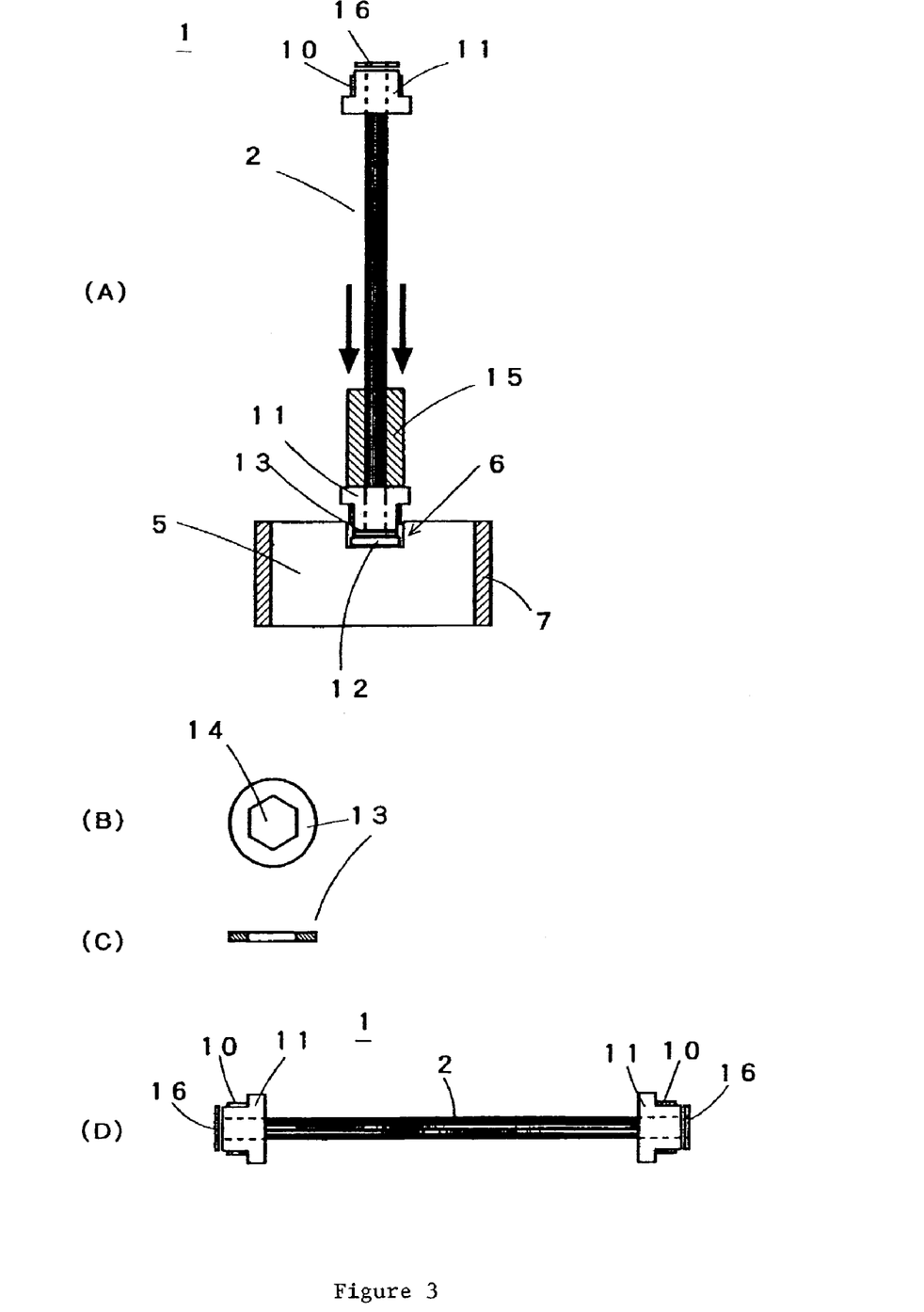
FIG. 3 is a drawing that illustrates the method of forming a flange portion on the separation membrane module having hollow fibers of the present invention.

FIG. 3 is a drawing that illustrates the method of forming a flange portion on the separation membrane module having hollow fibers of the present invention.

FIG. 3(A) is a drawing that illustrates the method of forming the flange portion, and FIGS. 3(B) and 3(C) are drawings showing the material for forming the flange portion. FIG. 3(B) is a plan view and FIG. 3(C) is a cross section. Moreover, FIG. 3(D) is a drawing that illustrates a separation membrane module having hollow fibers with a flange.

As shown in FIG. 3(A), once hollow fibers 2 have been fused and integrated together at both ends, two cap screws 11 with peripheral threads 10 are used to secure the separation membrane module at the two ends thereof or to connect the module to a device.

On the other hand, a member 13 for forming a flange portion is placed at the top of a pedestal 12 in the indentation 6 of the mold 5. The member 13 for molding a flange portion is shaped as a disk, as shown in FIGS. 3(B) and 3(C), and has in its interior an opening 14, which matches the shape of the fused and integrated hollow fibers. In this example, the hollow fibers are inserted into a regular hexagonal sheath, fused, and integrated, and hence have the same shape as the sheath that was used at this time.

Next, the hollow fibers thus fused and integrated are inserted into the member 13 for forming a flange portion, and the mold 5 is heated by the heater 7 in a state in which the hollow fibers are pressed down by placing a weight 15 on top of one of the cap screws 11, exerting pressure with another member, or using a different method in order to join the fused and integrated hollow fibers with the member 13 for forming a flange portion. The flange portion 16 is thereby formed.

After the flange portion 16 has been formed at one end, the flange portion 16 is similarly formed at the other end, yielding the separation membrane module having hollow fibers shown in FIG. 3(D).

The member for forming a flange portion can be fused and integrated using the same material as the hollow fibers, but it is preferred that the material for forming the flange portion be one that is obtained by admixing a plasticizer or other material with a reduced glass transition point into the hollow fiber material so that the portions obtained by fusing the hollow fibers together do not re-melt when the flange portion is formed.

When thermofusible fluororesin is used for the hollow fibers of the present invention, it is preferred that the material for forming the flange portion be one that is obtained by mixing a perfluoropolyether with the thermofusible fluororesin used for the hollow fibers in order to reduce the glass transition temperature and to improve fluidity in comparison with the thermofusible fluororesin. Thus, a flange portion can be formed without any detrimental effects on the part of the hollow fibers that is fused by heating.

Figure 4:
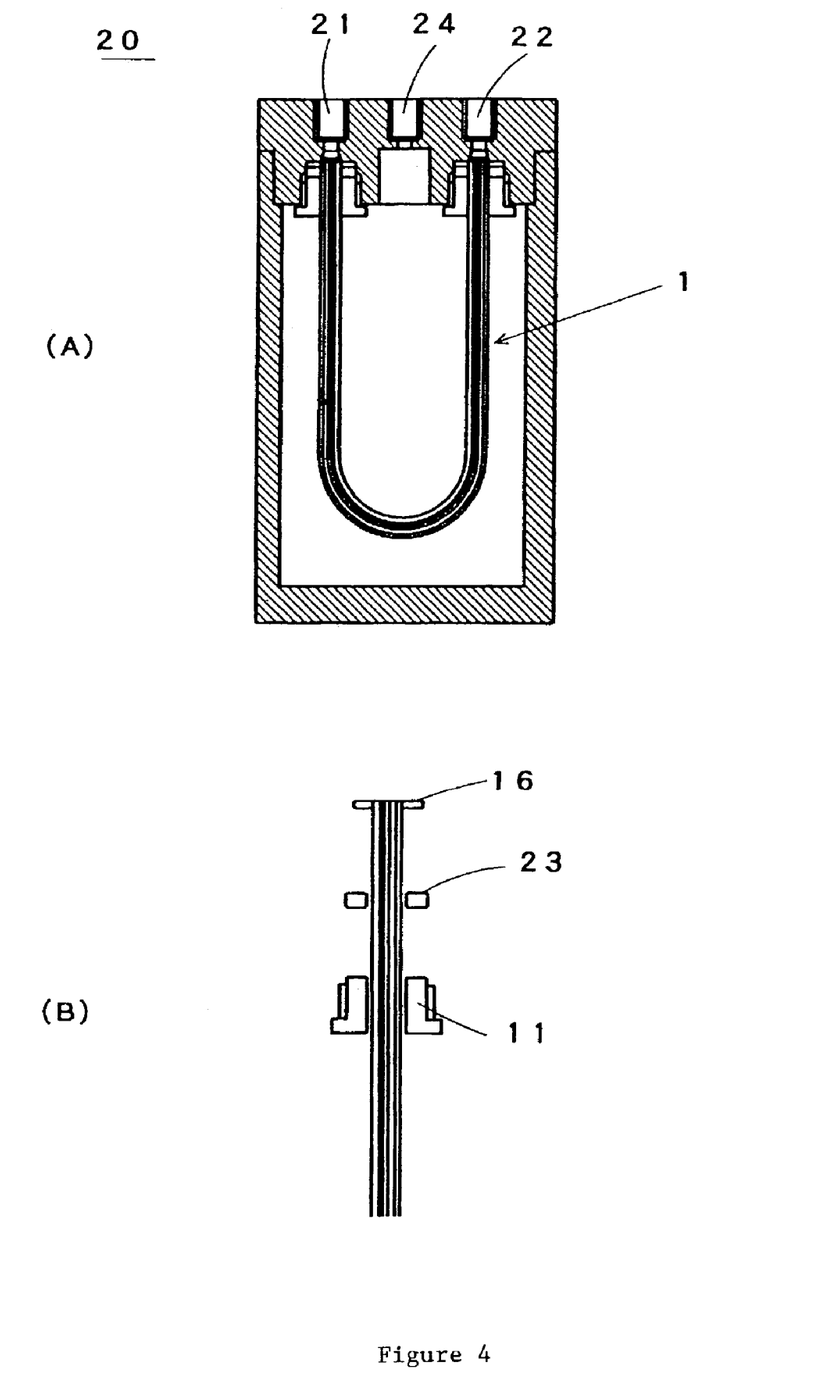
FIG. 4 is a drawing that illustrates an example of a degassing device that uses the separation membrane module having hollow fibers of the present invention.

FIG. 4 is a drawing that depicts an example of a degassing device that uses the separation membrane module having hollow fibers of the present invention. FIG. 4(A) is a cross-sectional view, and FIG. 4(B) is a drawing that illustrates the end of the separation membrane module wherein hollow fibers have been fused.

The separation membrane module 1 having hollow fibers is attached to a degassing device 20; a liquid inlet 21 is attached to one side; and a liquid outlet 22 is attached to the other side.

The hollow fibers of the separation membrane module 1 having hollow fibers are fused together and integrated at one end, and a flange portion 16 is formed at this end. The module also comprises a gasket 23 that makes contact with the flange portion 16 and maintains airtightness in relation to the degassing device, and further comprises cap screws 11 for fastening these members to the mounting portion of the degassing device, making it possible to fasten the assembly to the mounting portion of the degassing device with the aid of the cap screws 11.

The degassing device 20 is also provided with a decompression means connection port 24. Gas can be separated from the liquid that passes through the hollow fibers by reducing the gas pressure on the inside with a decompression means to form a pressure difference on the two sides of the hollow fibers.

The above description was given with reference to a separation membrane module having a plurality of hollow fibers, but the method of forming a flange portion of the present invention can be similarly applied to a separation membrane module that uses a single hollow fiber, which is appropriate for applications in which small amounts are treated.

Figure 5:
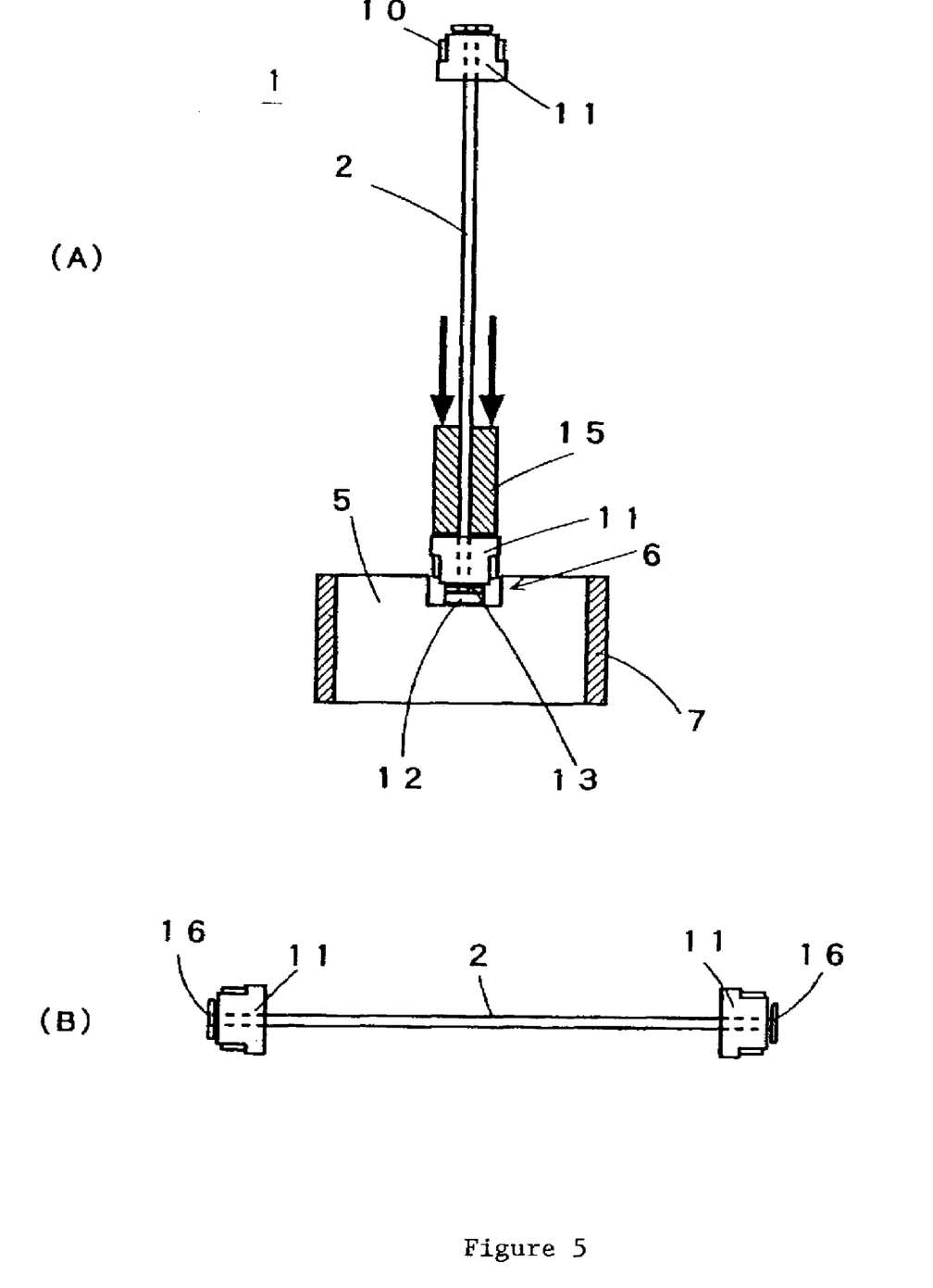
FIG. 5 is a drawing that illustrates the method of manufacturing a separation membrane module having a single hollow fiber.

FIG. 5 is a drawing that illustrates the method of manufacturing a separation membrane module having a single hollow fiber. FIG. 5(A) is a cross-sectional view that illustrates the method of forming a flange, and FIG. 5(B) is a drawing that illustrates the module thus manufactured.

As shown in FIG. 5(A), two cap screws 11 with peripheral threads 10 are driven into the hollow fiber 2 in order to secure the separation membrane module or to connect the module to a device.

On the other hand, a member 13 for forming a flange portion is placed at the top of a pedestal 12 in the indentation 6 of the mold 5. The member 13 for molding the flange portion has a round opening that matches the shape of the hollow fibers.

Next, hollow fibers are inserted into the member 13 for forming the flange portion, and the mold 5 is heated by a heater 7 in a state in which the hollow fibers are pressed down by placing a weight 15 on top of one of the cap screws 11, exerting pressure with another member, or using a different method in order to join the fused and integrated hollow fibers with the member 13 for forming the flange portion. A flange portion 16 is thereby formed.

After the flange portion 16 has been formed at one end, the flange portion 16 is similarly formed at the other end, yielding the separation membrane module having hollow fibers shown in FIG. 5(B).

A resin that has a predetermined gas permeability and comprises a synthetic resin with a thermofusible surface can be used for the hollow fibers employed in the separation membrane module having hollow fibers of the present invention. It is particularly preferable to use a thermofusible fluororesin that has high corrosion resistance. Specific examples include amorphous copolymers of perfluoro-2,2-dimethyl-1,3-dioxole and polytetrafluoroethylene, tetrafluoroethylene-perfluoroalkoxyethylene copolymer (PFA), and tetrafluoroethylene-hexafluoropropylene copolymer (FEP).

Preferable among these are Teflon AF1600, AF2400, and the like, which are made by DuPont and are amorphous copolymers containing 60 to 90 mol % of perfluoro-2,2-dimethyl-1,3-dioxole and 10 to 40 mol % of polytetrafluoroethylene. Hollow fibers formed from these fluororesin amorphous copolymers are readily permeable by carbon dioxide, oxygen, hydrogen, nitrogen, and the like, and can therefore be used as degassing means for separating these gases from liquids, as gas dissolution means for dissolving these gases in liquids, and the like.

Moreover, it is not necessary to use the same synthetic resin material for forming all the hollow fibers of the separation membrane modules having hollow fibers of the present invention. It is possible to form a thermofusible fluororesin layer on a porous member substrate composed of polytetrafluoroethylene or another non-thermofusible fluororesin, or to form a thermofusible fluororesin layer on at least the end.

The thermofusible layers formed as surface layers can be sufficiently thick to fill the spaces between the hollow fibers with the substance that has melted from the surface layer when the surface layer is heated, melted, thermally fused, and integrated after the hollow fibers have been placed inside a sheath.

In particular, if a thermofusible fluororesin with good corrosion resistance, heat resistance, and chemical resistance is used for the hollow fibers and for the flange that is fused and integrated therewith, all the members will be composed of the fluororesin when the membrane module is joined, mounted, or otherwise connected to a device with cap screws and flanges, making the product suitable for separation membrane modules, degassing tubes, and other devices used in environments where acids, alkalis, organic solvents, and the like are used as media or detergents. These devices can also be used as gas dissolution modules for dissolving ozone and other highly reactive gases in liquids.

For example, these devices may be used as degassing modules for HPLC (high-performance liquid chromatography), blood analysis equipment, semiconductor production equipment, modules for dissolving ozone in ultra-pure water, and the like.

The present invention will now be explained with examples:

EXAMPLE 1

Both ends of 37 hollow fiber of amorphous fluororesin copolymer (DuPont, Teflon AF1600) with a diameter of 0.6 mm, inner diameter of 0.45 mm, thickness of 0.075 mm, and length of 100 mm were inserted into a polytetrafluoroethylene sheath with a regular hexagonal opening. The sheath was kept for 15 minutes inside a mold that had been heated to 240° C., with the spaces inside the sheath being joined to and decompressed with a polytetrafluoroethylene tube for decompression. The surfaces of the hollow fibers inside the sheath were integrally fused, and the sheath was then removed from the mold and cooled. After the yarns at one end were fused and integrated, the yarns at the other end were similarly fused and integrated.

Next, two cap screws made of polytetrafluoroethylene were driven into both ends of the integrally fused hollow fibers, and a regular hexagonal opening capable of accommodating the external shape of integrally fused hollow fibers was formed on the inside of a tabular article with a thickness of 1.0 mm, yielding a member for forming a flange portion. (The tabular article was obtained by mixing and molding 20 parts by weight of a perfluoropolyether (DuPont, Krytox GPL-107) with 80 parts by weight of an amorphous fluororesin copolymer that was used for the hollow fibers (DuPont, Teflon AF1600).)

The member for forming the flange portion was placed on the tabular article made of polytetrafluoroethylene and placed inside a mold, and the fused and integrated hollow fibers were inserted into the opening of the member for forming the flange portion. A load of 490 mN was applied to the area of the cap screws, and the assembly was allowed to stand for 5 minutes in the mold, which had been heated to 200° C., to form the flange portion.

When the cap screws of the resulting separation membrane module having hollow fibers were joined with a connector, and nitrogen at a pressure of 0.2 MPa was fed in water, bubbles were produced from the separation membrane module, but there was no leakage or the like from the connector joint.

The present invention can provide a separation membrane module having hollow fibers in which the flange is fused and integrated after the interior of a sheath is densely packed with hollow fibers composed of thermofusible synthetic resin, and the surfaces of the hollow fibers are melted by heating and integrated by thermal fusion, thereby providing excellent airtightness and other bonding characteristics to the joints of the hollow fibers.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A separation membrane module comprising a plurality of hollow fibers disposed within a sheath, each of said hollow fibers consisting of a thermofusibile fluororesin, and having an external surface wherein at least a portion of the external surface of each hollow fiber is thermally fused directly to at least one other hollow fiber and at the external surface of at least some of said hollow fibers is thermally fused to the sheath.

2. A separation module having hollow fibers according to claim 1, characterized in that said thermofusible fluororesin contains 60 to 90 mol % of perfluoro-2,2-dimethyl-1,3 dioxole and 10 to 40 mol % of polytetrafluoroethylene.

3. A method of manufacturing a separation membrane module having hollow fibers, said method comprising:
   providing a plurality of hollow fibers consisting of a thermofusible fluororesin, each said fiber having a first end having an external surface and a second end,
   inserting said first end of each of said plurality of hollow fibers into a sheath, such that a plurality of spaces are formed between the sheath and the hollow fibers;
   melting the external surface of said plurality of fibers by heating the sheath portion into which the hollow fibers have been inserted, and
   compressing the sheath and the hollow fibers to directly fuse the exterior surfaces of the hollow fibers and the sheath.

4. A method of manufacturing a separation membrane module having hollow fibers, said method comprising:
   providing a plurality of hollow fibers consisting of a thermofusible fluororesin, each said fiber having a first end and a second end;
   inserting at least the first ends of the hollow fibers into the opening of a flange-forming member having a lower glass transition point than that of the hollow fibers;
   heating the flange-forming member and hollow fibers to a temperature at which the hollow fibers will not melt, to fuse the flange-forming member to the hollow fibers, and thereby to form a flange portion.

5. The method according to claim 4, wherein the hollow fibers are subjected to a process in which at least the first ends of the plurality of hollow fibers are inserted into a sheath, the sheath and the hollow fibers are tightly bonded together to form spaces, and the sheath portion into which the hollow fibers have been inserted is heated up to the temperature at which the surfaces of the hollow fibers melt, with the spaces thus formed kept in a decompressed state, so that the exterior surfaces of the hollow fibers are thermally fused and integrated together.

6. The separation membrane module of claim 1 in which the thermofusible fluororesin is an amorphous copolymer of perfluoro-2,2-dimethyl-1,3 dioxole and polytetrafluoroethylene.

7. The separation membrane module of claim 1 in which the thermofusible fluororesin is tetrafluoroethylene-hexafluoropropylene copolymer.

8. The separation membrane module of claim 1 in which the thermofusible fluororesin is tetrafluorothylene-perfluoroalkoxyethylene copolymer.

9. The method of manufacturing a separation membrane module of claim 3 in which the thermofusible fluororesin is an amorphous copolymer of perfluoro-2,2- dimethyl-1,3 dioxole and polytetrafluoroethylene.

10. The method of manufacturing a separation membrane module of claim 3 in which the thermofusible fluororesin is tetrafluoroethylene-hexafluoropropylene copolymer.

11. The method of manufacturing a separation membrane module of claim 3 in which the thermofusible fluororesin is tetrafluoroethylene-perfluoroalkoxyethylene copolymer.

12. The method of manufacturing a separation membrane module of claim 4 in which the thermofusible fluoropolymer is an amorphous copolymer of perfluoro-2,2-dimethyl-1,3 dioxole, and polytetrafluoroethylene.

13. The method of manufacturing a separation membrane module of claim 4 in which the thermofusible fluororesin is tetrafluoroethylene-hexafluoropropylene copolymer.

14. The method of manufacturing a separation membrane module of claim 4 in which the thermofusible fluororesin is tetrafluoroethylene-perfluoroalkoxyethylene copolymer.

* * * * *